US010911526B2

(12) United States Patent
Sherf et al.

(10) Patent No.: US 10,911,526 B2
(45) Date of Patent: Feb. 2, 2021

(54) CONTENT DELIVERY NETWORK

(71) Applicant: Vimmi Communications Ltd., Rehovot (IL)

(72) Inventors: Amnon Sherf, Modiin (IL); Max Mashnitsky, Vinnytsia (UA); Ehud Spiegel, Petach-Tikva (IL)

(73) Assignee: Vimmi Communications Ltd., Kfar Kasem (IL)

( * ) Notice: Subject to any disclaimer, the term of this patent is extended or adjusted under 35 U.S.C. 154(b) by 0 days.

(21) Appl. No.: 16/587,132

(22) Filed: Sep. 30, 2019

(65) Prior Publication Data

US 2020/0028898 A1 Jan. 23, 2020

Related U.S. Application Data

(63) Continuation of application No. 15/470,962, filed on Mar. 28, 2017, now Pat. No. 10,432,708, which is a
(Continued)

(51) Int. Cl.
*H04L 12/26* (2006.01)
*H04N 21/20* (2011.01)
(Continued)

(52) U.S. Cl.
CPC ...... *H04L 67/1008* (2013.01); *H04L 43/0817* (2013.01); *H04L 61/1511* (2013.01);
(Continued)

(58) Field of Classification Search
None
See application file for complete search history.

(56) References Cited

U.S. PATENT DOCUMENTS 6,108,703 A  8/2000 Leighton et al.
6,553,376 B1  4/2003 Lewis et al.
(Continued)

FOREIGN PATENT DOCUMENTS

WO  WO 2017/042813  3/2017

OTHER PUBLICATIONS

Advisory Action Before the Filing of an Appeal Brief dated Feb. 2, 2018 From the US Patent and Trademark Office Re. U.S. Appl. No. 151470,962. (3 pages).
(Continued)

*Primary Examiner* — Joshua Joo

(57) ABSTRACT

A content delivery system comprising one or more one management servers comprising one or more processors for executing a code of one or more management agent instances. The code comprising code instructions to monitor a plurality of delivery servers of a distributed network to update dynamically a content record listing a plurality of content objects according to availability parameter(s) of each delivery server, code instructions to receive a content request from (user) client device to retrieve requested content object(s), code instructions to select preferred delivery server(s) from the delivery servers to provide the requested content object(s) to the client device according to analysis of the availability parameter(s) of each delivery server and code instructions to provide the client device with an IP address of the selected delivery server(s) to allow the client device to retrieve the requested content object(s) via a transmission session established with the selected delivery server(s).

17 Claims, 2 Drawing Sheets

Related U.S. Application Data continuation of application No. PCT/IL2016/050999, filed on Sep. 8, 2016.

(60) Provisional application No. 62/216,390, filed on Sep. 10, 2015.

(51) Int. Cl.
  *H04L 29/08* (2006.01)
  *H04L 29/06* (2006.01)
  *H04N 21/00* (2011.01)
  *H04L 29/12* (2006.01)

(52) U.S. Cl.
  CPC ...... *H04L 61/2007* (2013.01); *H04L 65/4084* (2013.01); *H04L 65/80* (2013.01); *H04L 67/1029* (2013.01); *H04N 21/00* (2013.01); *H04N 21/20* (2013.01); *H04L 43/0852* (2013.01); *H04L 43/0888* (2013.01); *H04L 67/2842* (2013.01)

(56) References Cited

U.S. PATENT DOCUMENTS

| | | |
|---|---|---|
| 6,820,133 B1 | 11/2004 | Grove et al. |
| 7,103,645 B2 | 9/2006 | Leighton et al. |
| 7,240,100 B1 | 7/2007 | Wein et al. |
| 7,693,959 B2 | 4/2010 | Leighton et al. |
| 7,921,226 B2 | 4/2011 | Mukherjee et al. |
| 8,073,961 B2 | 12/2011 | Leighton et al. |
| 8,271,617 B2 | 9/2012 | Thomson et al. |
| 8,281,035 B2 | 10/2012 | Farber et al. |
| 8,296,396 B2 | 10/2012 | Farber et al. |
| 8,516,082 B2 | 8/2013 | Cadwell et al. |
| 8,521,851 B1 | 8/2013 | Richardson et al. |
| 8,521,885 B1 | 8/2013 | Richardson et al. |
| 8,572,208 B2 | 10/2013 | Farber et al. |
| 8,576,744 B2 | 11/2013 | Kovvali et al. |
| 8,577,997 B2 | 11/2013 | Thomson et al. |
| 8,645,517 B2 | 2/2014 | Stolorz et al. |
| 2002/0069241 A1 | 6/2002 | Narlikar et al. |
| 2003/0174648 A1 | 9/2003 | Wang et al. |
| 2005/0060497 A1 | 3/2005 | Krissell et al. |
| 2006/0005224 A1 | 1/2006 | Dunning et al. |
| 2006/0075139 A1 | 4/2006 | Jungck |
| 2007/0016662 A1* | 1/2007 | Desai ............... H04L 29/06 709/223 |
| 2007/0118667 A1 | 5/2007 | McCarthy et al. |
| 2007/0124781 A1 | 5/2007 | Casey et al. |
| 2009/0254661 A1 | 10/2009 | Fullagar et al. |
| 2009/0259766 A1 | 10/2009 | Karlsson et al. |
| 2010/0077056 A1 | 3/2010 | Kokal et al. |
| 2012/0023153 A1 | 1/2012 | Karasaridis |
| 2012/0066371 A1 | 3/2012 | Patel et al. |
| 2012/0079276 A1 | 3/2012 | Evans et al. |
| 2012/0089700 A1 | 4/2012 | Safruti et al. |
| 2012/0096128 A1 | 4/2012 | Maloo |
| 2012/0106333 A1 | 5/2012 | Lee et al. |
| 2012/0110113 A1 | 5/2012 | Lee et al. |
| 2012/0197822 A1* | 8/2012 | Lee ................ H04L 67/16 706/10 |
| 2012/0198045 A1 | 8/2012 | Sakata et al. |
| 2012/0297033 A1 | 11/2012 | Raciborski et al. |
| 2013/0060903 A1 | 3/2013 | Blewett |
| 2013/0212264 A1 | 8/2013 | Troppens et al. |
| 2013/0262697 A1 | 10/2013 | Karasaridis et al. |
| 2013/0339519 A1 | 12/2013 | Lientz |
| 2014/0297870 A1 | 10/2014 | Eggleston et al. |
| 2014/0304386 A1 | 10/2014 | Lyon |
| 2015/0121413 A1 | 4/2015 | Ramakrishnan et al. |
| 2015/0195138 A1 | 7/2015 | Horman |
| 2015/0229710 A1 | 8/2015 | Sivasubramanian et al. |
| 2016/0164997 A1 | 6/2016 | Karasaridis et al. |
| 2016/0182670 A1 | 6/2016 | Scharber et al. |
| 2016/0191356 A1 | 6/2016 | Sundaresan |
| 2016/0294956 A1 | 10/2016 | Fix et al. |
| 2017/0201571 A1 | 7/2017 | Sherf et al. |
| 2019/0058645 A1* | 2/2019 | Kellicker ............. H04L 41/142 |

OTHER PUBLICATIONS

Communication Pursuant to Article 94(3) EPC dated Aug. 20, 2019 From the European Patent Office Re. Application No. 16775344.1. (8 Pages).
International Preliminary Report on Patentability dated Mar. 22, 2018 From the International Bureau of WIPO Re. Application No. PCT/IL2016/050999. (9 Pages).
International Search Report and the Written Opinion dated Nov. 30, 2016 From the International Searching Authority Re. Application No. PCT/IL2016/050999.
Official Action dated Apr. 5, 2019 From the US Patent and Trademark Office Re. U.S. Appl. No. 15/470,962. (18 pages).
Official Action dated Dec. 12, 2017 From the US Patent and Trademark Office Re. U.S. Appl. No. 15/470,962. (12 pages).
Official Action dated Jun. 28, 2017 From the US Patent and Trademark Office Re. U.S. Appl. No. 15/470,962. (36 pages).
Official Action dated Oct. 30, 2018 From the US Patent and Trademark Office Re. U.S. Appl. No. 15/470,962. (34 pages).
Office Action dated Dec. 17, 2019 From the Israel Patent Office Re. Application No. 258018. (14 Pages).

* cited by examiner

CONTENT DELIVERY NETWORK

RELATED APPLICATIONS

This application is a continuation of U.S. patent application Ser. No. 15/470,962 filed on Mar. 28, 2017, which is a continuation of PCT Patent Application No. PCT/IL2016/050999 having International Filing Date of Sep. 8, 2016, which claims the benefit of priority under 35 USC § 119(e) of U.S. Provisional Patent Application No. 62/216,390 filed on Sep. 10, 2015, the contents of which are incorporated herein by reference in their entirety.

FIELD AND BACKGROUND OF THE INVENTION

The present invention, in some embodiments thereof, relates to content delivery, and, more specifically, but not exclusively, to content delivery through a distributed content delivery system in which a plurality of content objects are managed and delivery by local management and delivery servers assigned to each segment of the content delivery system.

A content delivery network or content distribution network (CDN) is a large distributed system of servers deployed in multiple data centers across the Internet, i.e. the World Wide Web (WWW) for serving content to end-users with high availability and high performance. CDNs serve a large fraction of the Internet content today, including web objects (text, graphics and scripts), downloadable objects (media files, software, documents, etc.), applications (e-commerce, portals), live streaming media, on-demand streaming media, social networks and/or the like.

Content providers such as media companies and e-commerce vendors pay CDN operators to deliver their content to their audience of end-users. In turn, a CDN pays internet service providers (ISPs), carriers, and network operators for hosting the delivery servers in their data centers.

CDN nodes (servers) which may reach extremely high numbers are typically deployed in multiple locations, often over multiple backbones in order to reduce bandwidth costs, improve page load times, increase global availability of the content and/or the like. In some of the CDNs, the CDN nodes may be distributed over large numbers of geographical points of presence (PoPs) while other CDNs may employ a more centralized deployment in which the CDN nodes are concentrated in a small number of PoPs.

SUMMARY OF THE INVENTION

According to an aspect of some embodiments of the present invention there is provided a content delivery system, comprising one or more management servers each comprising one or more processors for executing a code of one or more management agent instances, the code comprising:

Code instructions to monitor a plurality of delivery servers of a distributed network to update dynamically a content record listing a plurality of content objects according to one or more availability parameters of each of the delivery servers.

Code instructions to receive a content request from a user using a client device to retrieve one or more requested content objects from the plurality of content objects.

Code instructions to select one or more preferred delivery server from the plurality of delivery servers to provide the one or more requested content objects to the client device according to an analysis of the one or more availability parameters of each of the plurality of delivery servers.

Code instructions to provide the client device with an internet protocol (IP) address of the one or more selected delivery servers to allow the client device to retrieve the one or more requested content objects via a transmission session established with the one or more selected delivery servers.

The content delivery system is utilized through a CDN.

The monitoring is directed to maintain an updated awareness of the one or more management agents about the one or more availability parameters of each of the plurality of content objects.

The monitoring is done by communicating over a networked data grid with a plurality of delivery agents each executed by a respective one of the plurality of delivery servers. Each of the plurality of delivery agents reports to the one or more management agents a dynamically updated local content record listing at least a subset of the plurality of content objects available by the respective one of the plurality of delivery servers according to the one or more availability parameter.

Each of the plurality of content objects is a member selected from a group consisting of: a data object, a media object, a text object, a video object, an audio object and/or a combination of any two or more members thereof.

One or more of the plurality of delivery servers is an edge server located at an edge of the distributed network to provide the client device an access to one or more of a plurality of services provided through the distributed network.

The distributed network is controlled by a plurality of management agents, each functions as the management agent and designated to control one of a plurality of segments of the distributed network. Each of the segments maintains a network locality.

The content record is a member selected from a group consisting of: a list, a table, a database and/or a combination of any two or more members thereof.

Each of the plurality of content objects listed in the content record is identified by a content type, a content object identification record and one or more content characteristic of the each content object.

The one or more availability parameters indicates one or more of: an accessibility to the one or more requested content object, a latency for retrieving the one or more requested content object, an availability of network resources, an availability of storage resources, an availability of computing resources and a workload level.

The accessibility to the one or more requested content object indicates that the one or more requested content object is available to a respective one of the plurality of delivery servers from one or more of: a local storage, a content provider origin server, a remote server and a shared storage.

The one or more management agents adjusts a routing map of a DNS server serving the distributed network in order to direct the content request to the one or more management server.

The one or more management agent comprises at least some functionality to resolve the internet protocol (IP) address.

The one or more selected delivery servers are estimated to present the best performance among the plurality of delivery servers for providing the one or more requested content object. The best performance is evaluated based on one or more of a plurality of performance criteria selected from a group consisting of: latency, a size of a Link Aggregation Group (LAG), throughput, quality of service (QoS), network utilization, storage utilization and/or cost.

The one or more management agents is informed of one or more new content objects by monitoring one or more origin server providing the one or more new content objects.

One or more additional management agent is launched to manage a plurality of additional content request in case the one or more management agents is overloaded.

The one or more management agent instruct launching one or more additional delivery servers for serving the client device in case the plurality of delivery servers are overloaded.

One or more of the plurality of delivery servers perform as the management server executing the one or more management agents.

The one or more management agents select the one or more selected delivery servers according to at least future availability parameters of each of the plurality of delivery servers.

Optionally, the one or more management agents select the one or more selected delivery servers from a plurality of $3^{rd}$ party delivery servers available from one or more other content delivery vendor.

Optionally, the one or more management agent select the one or more selected delivery servers according to one or more operational characteristic of the client device. The one or more selected delivery servers are capable of providing a plurality of alternative content objects to the one or more requested content objects to allow the client device to select a desired alternative from the plurality of alternative content objects according to the one or more operational characteristics of the client device.

The system of claim 1, further comprising the one or more management agents select the one or more selected delivery servers to provide the one or more requested content object according to one or more characteristic of the user.

The one or more management agent select the one or more selected delivery server to provide one or more adjusted content object in response to the content request. Bandwidth of the one or more adjusted content object is adapted according to a network resources availability.

Optionally, the one or more management agents select the one or more selected delivery servers to provide one or more represented content objects in response to the content request. The one or more represented content objects are manipulated in one or more modes selected from, for example, including an additional content coupled with the one or more requested content objects, overlaying the one or more requested content objects with one or more overlaid content objects and/or replacing the one or more requested contents object with one or more replacement content objects.

Optionally, the one or more management agents dynamically direct the client terminal to establish the transmission session with one or more other delivery server for retrieving the one or more requested content in case the one or more management agents evaluate that the one or more other delivery server are expected to present better performance than the one or more selected delivery servers for providing the one or more requested content objects.

The evaluation results from a change in the one or more availability parameters of the one more selected delivery servers that degrade a performance of the one or more selected delivery servers.

The evaluation results from a change in a geographical location of the client device.

Optionally, the one or more management agents is configured by one or more managing user.

Optionally, the one or more management agents employ one or more learning mechanisms to identify one or more content consumption patterns by analyzing a plurality of content requests such as the content request. The one or more consumption patterns are used to one or more of: selection of the one or more selected delivery servers and/or management of the availability of the plurality of content objects.

According to an aspect of some embodiments of the present invention there is provided a method of delivering content in a distributed network environment by analyzing one or more requested content objects to select one or more preferred delivery servers according to content availability. The method comprising one or more management servers executing one or more management agents adapted to:

Monitor a plurality of delivery servers of a distributed network to update dynamically a content record listing a plurality of content objects according to one or more availability parameters of each of the plurality of delivery servers.

Receive a content request from a user using a client device to retrieve one or more requested content objects from the plurality of content objects.

Select one or more preferred delivery servers from the plurality of delivery servers to provide the one or more requested content objects to the client device according to an analysis of the one or more availability parameters of each of the plurality of delivery servers.

Provide the client device with an internet protocol (IP) address of the one or more selected delivery servers to allow the client device to retrieve the one or more requested content objects via a transmission session established with the one or more selected delivery servers.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
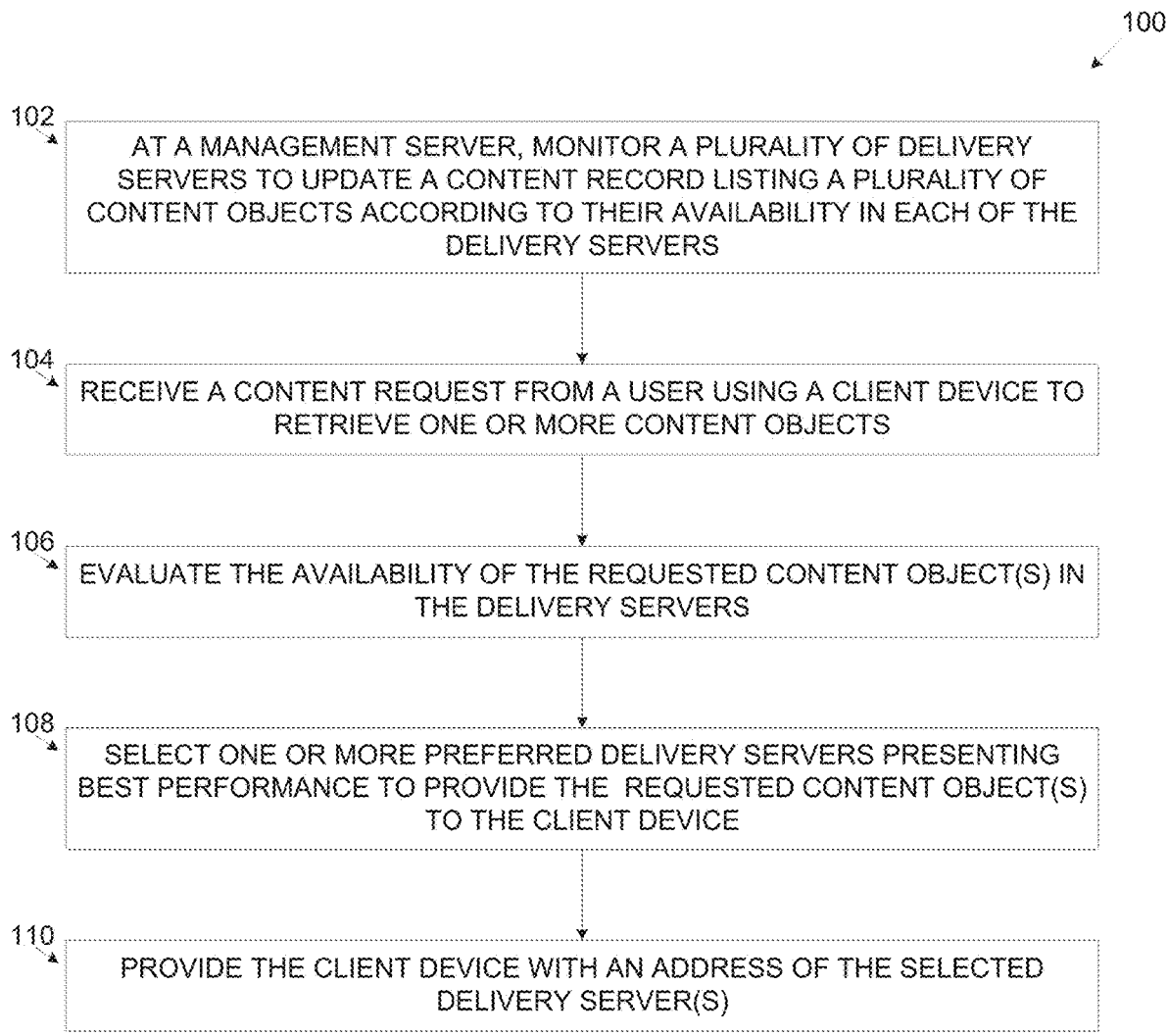
FIG. 1 is a flowchart of an exemplary process for delivering content object(s) to a client device, according to some embodiments of the present invention.

The present invention, in some embodiments thereof, relates to content delivery, and, more specifically, but not exclusively, to content delivery through a distributed content delivery system in which a plurality of content objects are managed and delivery by local management and delivery servers assigned to each segment of the content delivery system.

According to some embodiments of the present invention, there are provided systems and methods for a distributed content delivery system for providing one or more of a plurality of content objects to one or more client device. The distributed content delivery system includes one or more management servers that may continuously monitor a plurality of delivery servers in order to identify an availability of each of the content object(s) available for delivery by the content delivery system. In particular, each management server may control a segment of the distributed content delivery system in which one or more delivery servers are deployed. In a preferred embodiment of the present invention, the delivery server(s) may be utilized through edge server(s) located near an access point of the client device(s) to the content delivery system.

Each of the management servers maintains a content record listing availability of each of the plurality of content objects available in the content delivery system. Similarly, each of the delivery servers maintains a local content record comprising one or more availability parameters for each of a plurality of content objects available by the respective delivery server, for example, an accessibility to the requested content object(s), a latency for retrieving the a requested content object(s) and/or the like. The availability parameters may further include general availability parameters of the respective delivery server, for example, availability of network resources, availability of storage resources, availability of computing resources, workload level, incurred cost and/or the like indicating the capability of respective delivery server to provide the respective content object.

The management server may continuously monitor the delivery servers in real time, in particular the delivery servers deployed in its controlled segment by communicating with the delivery servers over a data grid. The data grid provides a plurality of services and middleware applications for accessing, transferring and/or modifying data between network nodes, for example, servers in a distributed networked processing environment as is known in the art. Based on the local content record of each of the plurality delivery servers, the management server updates its content record that aggregates availability information for the plurality of content object from the plurality of delivery servers. The management server may further monitor origin server(s) and/or shared storage server(s) to which the content provider may upload new content objects in order to detect the newly uploaded content objects. Upon detection, the management server may inform the delivery server(s) of the update and may further assign one or more delivery server(s) to deliver the newly uploaded content objects in case they are requested by the client device(s).

When a content request for one or more requested content objects is received from one or more of the client devices, the management server analyzes the requested content object(s) according to the content record and evaluates which of the delivery servers may present best performance for providing the client device with the requested content object(s). The performance may be evaluated according to one or more performance criteria, for example, latency, size of a Link aggregation Group (LAG), throughput, quality of service (QoS), network utilization, storage utilization, processing load, cost and/or the like. Based on the evaluation, the management server selects one or more preferred delivery servers and replies to the client device with an address, for example, an internet protocol (IP) address, a Uniform Resource Location (URL), a link and/or the like of the selected delivery server(s). The client device may then use the provided address to initiate a transmission session with the selected delivery server(s) to retrieve the requested content object(s).

Optionally, the management server and the delivery server(s) are integrated together as a stand-alone "CDN in a box" server.

Optionally, the management server performs some and/or all tasks of a Domain Naming Service (DNS) server in the distributed content delivery system. The management server may manipulate routing maps and/or tables of DNS servers in the distributed content delivery system to direct the client device(s) to the management servers with minimal latency.

Optionally, one or more of the management servers and/or the delivery servers is provided by a cloud service, for example, Amazon™ cloud and/or the like.

The distributed content delivery system may present significant advantages compared to currently existing CDNs. The currently existing CDNs are typically constructed to have centralized management servers or clusters that are difficult to scale. The distributed content delivery system on the other hand, due to its distributed architecture, is highly scalable allowing the number of management servers and/or delivery servers to be dynamically adapted (increased or reduced) according to the content consumption requirements imposed by the client devices. This may allow reducing resources, for example, computing resources, storage resources, network resources and the like when the content consumption is low and yet cope with high content consumption requirements by launching additional management and/or delivery servers thus leading to an extremely effective utilization of the resources. The scaling may be based on stand-alone "CDN in a box" servers that may be added to address increases in the content consumption requirements. The distributed architecture may further support flexible configuration of the distributed content delivery system into content delivery groups and/or multi-groups that may be adapted per specific configuration parameters, for example, serving a certain content provider in a certain geographical location and/or the like.

Moreover, the distributed architecture may significantly reduce network traffic. As the content objects may be stored (cached) in the delivery servers distributed close to the client device(s) (end users) the requested content object(s) may be readily available without the need to transfer the requested content object(s) from the centralized delivery servers as may be done by the currently existing CDNs. This may further improve the network utilization thus possibly reducing costs.

Furthermore, using the edge servers as the management and/or delivery servers may take advantage of the evolving edge computing deployment where a plurality of tasks and/or services that may typically (traditionally) be provided from a network backbone and/or data center(s) may be executed by the one or more edge servers, for example, a mobile edge computing (MEC) node. By using the edge servers as the management servers, the response time to the content request from the client device(s) may be significantly reduced thus providing better service quality. In addition, by using the edge servers as the delivery servers, the content objects may be stored (cached) significantly close to the client device(s) thus reducing significantly the latency for providing the requested content object(s) to the client device(s). In addition, when utilized by the edge server(s), the management server(s) may manipulate DNS routing maps and/or tables of the DNS server(s) in the distributed content delivery system. This may be feasible since the edge servers located at the edge of the network where near the access points of the client devices and complex routing of the content requests and/or the requested content object to remote servers may be avoided.

In addition, the distributed content delivery system may be significantly more robust compared to the currently existing CDNs. The distributed content delivery system may support fast recovery and re-configuration in case of a failure and/or in case a re-deployment is required. Moreover, since the failures may be local to a limited number of segments of the distributed content delivery system, only a fraction of the distributed content delivery system may suffer from the failure. This is in contrast to the currently existing CDNs where a failure of a centralized management and/or delivery center may affect the entire CDN and/or significant parts of it.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process for delivering content object(s) to a client device, according to some embodiments of the present invention. A process 100 may be executed by one or more management servers for delivering one or more of a plurality of content objects requested by a client device. For brevity, the process 100 is described for providing the content object(s) to one client device, however naturally the process may be extended to serve a plurality of client devices. Each of the management servers may continuously monitor a plurality of delivery servers, in particular locally distributed delivery servers, each having access to one or more of a plurality of content objects, to evaluate availability of each of the delivery servers to deliver each of the plurality of content objects.

The management server monitors the delivery servers by continuously communicating with the delivery servers over a data grid providing a plurality of services and middleware applications for accessing, transferring and/or modifying data in a distributed networked processing environment as is known in the art. Each of the delivery servers maintains a local content record comprising one or more availability parameters for each of a plurality of content objects available by the respective delivery server, for example, an accessibility to the requested content object(s), a latency for retrieving the a requested content object(s) and/or the like. The accessibility may indicate for example, whether the requested content object(s) are stored locally (cached) by the delivery server or the requested content object(s) need to be retrieved from one or more other servers, for example, the origin server and/or the shared storage server. The latency may indicate an estimated time required for the respective delivery server to retrieve the requested content object(s), either from its local storage (if cached) or from the other server(s) (if not cached). The availability parameters may further include one or more general availability parameters of the respective delivery server, for example, availability of network resources, availability of storage resources, availability of computing resources, workload level, incurred cost and/or the like indicating the capability of respective delivery server to provide the respective content object. Based on the local content record of each of the plurality delivery servers, the management server may create and maintain a content record that aggregates the availability information for the plurality of content objects from the plurality of delivery servers. By continuously monitoring the delivery servers and maintaining the content record up to date, the management server may be aware accurately and constantly of the availability of each of the plurality of content objects.

When the content request for one or more requested content objects is received from the client device, the management server analyzes the requested content object(s) according to the content record and evaluates which of the delivery servers may present best performance for providing the client device with the requested content object(s). The performance may be evaluated according to one or more performance criteria, for example, latency, LAG, throughput, QoS, network utilization, storage utilization, processing load, cost and/or the like. Based on the evaluation, the management server selects one or more preferred delivery servers and replies to the client device with an address, for example, an IP address, a URL, a link and/or the like of the selected delivery server(s). For example, a delivery server that presents a lowest latency among all delivery servers for retrieving the requested content object(s) may be selected by the management server as the preferred delivery server. The client device may then use the provided address to initiate a transmission session with the selected delivery server(s) to retrieve the requested content object(s).

Figure 2:
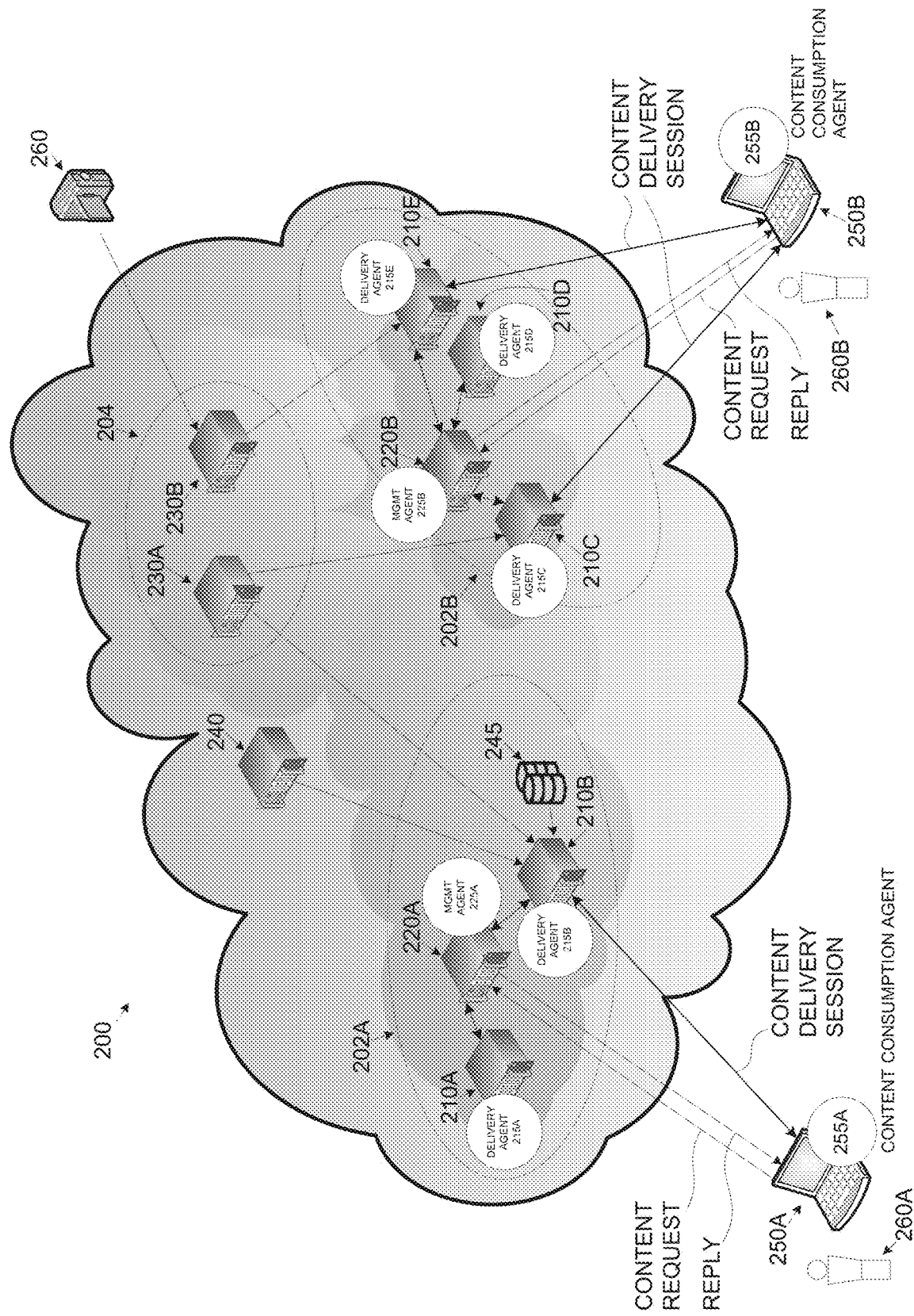
FIG. 2 is a schematic illustration of an exemplary system for delivering content object(s) to a client device, according

Reference is also made to FIG. 2, which is a schematic illustration of an exemplary system for delivering content object(s) to a client device, according to some embodiments of the present invention. A content delivery system 200, for example, a content distribution network (CDN) is directed to serve a plurality of users 260 using client devices 250 for providing data object(s) requested by the users 260 through the client devices 250.

The content delivery system 200 includes one or more servers deployed in a distributed network, for example, the Internet i.e. the WWW and/or part thereof, for example, a cloud segment, a cloud service, an organization network, a subscription network, a local network, a private network, a cellular network and/or the like. The servers may include a plurality of servers, for example, a processing node, a cluster of processing nodes, a base station, and/or the like. The servers in the content delivery system 200 may be utilize one or more function servers, for example, delivery server(s) 210, management servers 220, origin server(s) 230, shared storage server(s) 240, an/or the like. Each of the servers comprises one or more processing nodes each having one or more processors (homogenous or heterogeneous), which may be arranged for parallel processing, as clusters and/or as one or more multi core processing units. Each of the processor(s) may execute one or more software modules, wherein a software module refers to a plurality of program instructions stored in a non-transitory medium and executed by the processor(s). Optionally, one or more of the servers is a virtual machine that may be instantiated on one or more of the servers in the content delivery system 200, through a service provided by one or more service providers, through a cloud service and/or the like. Optionally, one or more of the servers is a service-based server, for example, a networked processing service, a cloud processing service and/or the like. The service-based servers may be provided, for example, by one or more cloud service provides, for example, Amazon, Google, Microsoft and/or the like. The service-based server as well as the virtual machine is capable of launching and executing the software module(s). The content delivery system 200 may be supported by one or more DNS servers for re-directing the content requests from the client device(s) 250 to the management server(s) 220 and/or for re-directing the client device(s) 250 to the delivery server(s) 210. The DNS server(s) may not be inherently included in the content delivery system 200 but may rather be available in the distributed network in which the content delivery system 200 is deployed.

Each of the content objects may be, for example, a data object, a media object, a text object, a video object, an audio object and/or a combination of any two or more content objects thereof. The content objects may be stored content objects available from storage, for example, a data file, a video on demand (VOD) movie, a song and/or the like. The content objects may further include streaming content objects captured from one or more of a plurality of streaming devices, for example, a camera 260, a microphone, a sensor and/or the like. The streaming data objects may include, for example, a feed of a live music concert, a feed of a live football match, a feed of a street view camera, a feed of a chat session, a feed of a weather sensor, a feed of a reading meter (e.g. a gas meter, an electricity meter, etc.) and/or the like.

The client device 250 used by the user 260 may be, for example, a Smartphone, a tablet, a connected car multimedia center, a Customer-Premises Equipment (CPE), a smart watch, a computer, a server, a network connected media device, a network enabled processing device and/or the like. The client device 250 may further include automated devices that are not necessarily associated with a particular user 260, for example, a digital media advertisement sign, a digital road sign, a public projector and/or the like. The client device 250 may execute one or more content consumption agents 255 software modules, for example, a media application, a mobile application, a web browser and/or the like for requesting, accessing, presenting and/or modifying the requested content object(s). The content consumption agent 255 may further be a remote service, for example, a cloud service used by the client terminal 250.

The plurality of content objects available through the content delivery system 200 may originate from one or more of the origin servers 230 that are registered for the content delivery system 200, i.e. the content delivery system 200 is assigned to serve content objects available from the origin server(s) 230. The origin servers 230 may include, for example, content provider servers, dedicated servers of the content system 200, global servers storing content objects, public servers and/or private servers that provide stored and/or streaming content objects. Each content object stored (cached) and/or streamed through the origin servers 230 may be available from the time the content object is uploaded to the origin server 230 and until is expires and/or removed. The plurality of content objects may further be available from one or more shared storage blocks that may reside on any of the servers in the content delivery system 200. The content delivery system 200 may further include dedicated shared storage servers 240, for example, a network attached storage (NAS), a shared storage array located at any of the servers deployed in the delivery system 200 and/or the like for storing one or more of the plurality of content objects. In case the content delivery system 200 is configured in a hierarchical structure as described herein after, one or more of the delivery servers 210 may serve as the origin server(s) for other one or more delivery server(s) 210. For example, in some configurations of the content delivery system 200, the delivery server 210A may serve as the origin server for the delivery server 210B.

The management servers 220 manage the content delivery while the delivery servers 210 actually provide the requested content objects to the client device(s) 250.

The content objects may be available to the delivery servers 210 from the origin server(s) 230 and/or the shared storage blocks, for example, the shared storage server(s) 240. However, in order to reduce latency and/or minimize a number of links of a Link Aggregation Group (LAG) used for retrieving and/or providing the requested content object(s) to the client device 250, it is highly desirable that the requested content object(s) are immediately available at the delivery server(s) 210 (cached). The delivery server 210 may store locally (cache) a subset of the plurality of content objects in a local storage 245, for example, a storage array, a local storage server 240, a local NAS and/or the like. In contrast to the origin servers 230, the delivery servers 210 may store the content object(s) for a limited time due to storage resources constraints. In case the requested content object(s) is not available to the delivery server 210 from the local storage, the delivery server 210 may fetch (retrieve) the requested content object(s) from the origin server(s) 230 and/or from one or more shared storage blocks available, for example, from the shared storage server(s) 240. The content object(s) may be cached at the delivery server 210 once it is loaded to the origin server 230 and/or at the time when the content object(s) is requested by the client device 250. Optionally, the delivery server 210 fetches the requested content object(s) from one or more other CDNs (not part of the content delivery system 200) from which the requested content object(s) are available.

In a preferred embodiment of the present invention, the delivery servers 210 and/or the management server 220 may be utilized through one or more edge servers located at the "edge" of the distributed network of the delivery system 200. The edge server may be a networking device for example, a cache server, an access server, an edge router, a base station, an Evolved Node B (eNodeB) and/or the like located close to the client device(s) rather than being part of the backbone of the network and/or a data center. As the edge server(s) may be close to the client device 250 they may provide high quality service to the client device 250, for example, high QoS, low latency, high bandwidth and/or the like. The edge server(s) may further be part of an at least partially MEC enabled network in which one or more tasks and/or services, for example, processing, computing, management, delivery and/or the like that may typically (traditionally) be provided from the network backbone and/or the data centers are executed and/or provided by the edge servers.

Moreover, in order to further improve the service quality and allow for high scalability of the content delivery system 200, two or more of the servers, i.e. the management server 220, the delivery server 210, the origin server 230 and/or the shared storage server 240 may be integrated together as a "CDN in a box" single server. The "CDN in a box" may be of particular benefit when the content delivery system 200 is deployed in a MEC enabled network.

The content delivery system 200 may be divided (segmented) to a plurality of segments 202 such as, for example, a segment 202A and a segment 202B. Each of the segments 202 may typically be characterized such that the delivery servers 210 and the management server(s) 210 distributed within the segment 202 are local to each other. The locality may be defined in terms of network capacity rather than in terms of geographical location (even though the delivery servers 210 and the management server(s) 210 may be located in close geographical proximity). The locality in network capacity relates to the networking resources involved with communication and/or data transfer among the delivery server(s) 210 and the management server(s) 210. For example, a short latency for the delivery servers 210 and the management server 210 accessing each other over the network, a high bandwidth of the network connecting them, low cost for transferring data among them and/or the like. As an example, a delivery server 210A, a delivery server 210B and a management server 220A are distributed in the segment 202A while the segment 202B comprises a management server 220B and delivery servers 210C, 210D and 210E. This means that rather than being based on one or more central management servers 220 for managing and delivering the requested content object(s) to the users 260, the delivery system 200 is constructed such that each of the segments 202 is managed by local one or more management servers 220. The segments 202 may overlap one another such that the delivery system 200 is fully covered by the plurality of local management servers 220. One or more delivery groups may be defined such that a delivery group may consist of one or more delivery server(s) 210 distributed in the same segment. The delivery group may be considered to deliver the requested content object(s) as a group effort. The group may further define the relations between the management server 220 and the delivery server(s) 210 in a respective segment 202.

The content delivery system 200 may further be configured in a hierarchical structure where one or more of the delivery servers 210 may serve as the origin server(s) for other one or more delivery server(s) 210. The hierarchical structure may utilize one or more hierarchies, for example, between layers of the content delivery servers 210, between different segments 202 and/or within one or more segments 202. One or more multi-groups may be defined to indicate, for example, relationships between the delivery groups.

The configuration of the content delivery system 200 may be driven from one or more content consumption requirements, for example, the number of served client devices 250, the throughput of content objects consumed by the client devices 250, the geographical location of the client devices 250, the number of segments 202 and/or the like. The basic unit of the content delivery system 200 may be a single server comprising both the management server 220 and the delivery server 210 installed in one location and referred to as a 1-node Point of Presence (PoP). The PoP may be extended to include multiple nodes to support the content consumption requirement(s). The content delivery system 200 may comprise a single PoP having full control and management as a stand-alone CDN ("CDN in a box") or multiple PoPs. In case the content delivery system 200 comprises multiple PoPs, the PoPs may be divided into several hierarchical levels, in which each level is regarded as a master responsible for its own control and management, and is being updated from the PoP in the hierarchical level beyond it, if exists. The PoP at the highest level is the general master of the content delivery system 200.

As previously discussed, the content delivery system 200 is controlled by the management server(s) 220 coupled with the delivery server(s) 210. Each of the management servers 220 may execute one or more software modules, for example, a management agent 225 for executing the content delivery process 100. In order to maintain an accurate view of the availability of each of the content objects available by the content delivery system 200, the management agent(s) 225 maintain a content record. Similarly, each of the delivery servers 210 may execute one or more software modules, for example, a delivery agent 215 for controlling the delivery of the content object(s) and maintaining a local content record. The local content record lists availability of the content objects to which the respective delivery server 210 has access, either from the local storage and/or from the remote content sources, such as, for example, the origin servers 230 and/or the shared storage servers 240.

The management agent(s) 225 may communicate continuously with the delivery agent(s) 215 to maintain the content record of the management server 220 updated in real time and synchronized with the local content record of each of the delivery server(s) 210. The management agent 225 may also communicate with one or more of the origin server 230 and/or the shared storage blocks, for example, the shared storage server(s) 240 to detect new content available from the origin server(s) 230.

The communication among the servers in the system 200, in particular, among the delivery server(s) 210, the management server(s) 220, the origin server(s) 230 and the shared storage server(s) 240 may be instrumented through a data grid. The data grid provides a set of middleware applications and services as is known in the art for accessing, transferring and modifying data. The management agent 225 and/or the delivery agents 215 may employ one or more of a plurality of communication modes supported by the data grid for receiving and/or exchanging messages among themselves, for example, push, pull, replicate, interrupt, polling, publish-subscribe and/or the like. The communication may further be facilitated by one or more shared memories and/or shared databases at one or more of the servers that store changes to the content record and the local content record(s). By polling and/or updating the shared memory(s), the management agents 225 and/or the delivery agents 215 may become aware and/or make others aware of the changes.

The middleware applications and services provided by the data grid may include, for example, a data grid manager, data grid agents and a data grid memory, for example, a shared memory array, a shared storage, a shared database and/or the like. The data grid manager and the data grid memory may be distributed among the plurality of servers in the content delivery system 200. Each agent (management agents 225 and/or delivery agent 215) may subscribe to the data grid memory through the data grid manager to support replication in its respective content record. The data grid manager may assign each of the agents a series of replication and/or distribution rules. The replication and/or distribution rules may define the content records that need to be monitored by the agents and therefore are allocated in the data grid memory. For each agent, the data grid manager may define the type of change(s) in the content record to be monitored and should therefore remain (persist) in the subscribed data grid memory assigned to the subscribed agent (server). For example, if a content object handled by one of the agents contains information that should be stored and/or used to make change(s) in the content record, the respective agent should store in a persistent manner the changes relating to the content object in the subscribed data grid memory.

The agents subscribed to the data grid memory may constantly monitor the data grid memory they are subscribed to in order to detect the change(s). The agents update their content record with relevant changes to the content objects that are detected through the data grid mechanism.

Through the data grid mechanism, any of the agents may request data from one or more other agents. In such case, the requested agent first looks at its subscribed data grid memory(s) and if the data is not found there, the agent checks the associated content record to update the subscribed data grid memory(s). This may provide for a significantly short (potential) replication delay.

As defined by the data grid mechanism, each of the agents may first update the subscribed data grid memory before replicating the change to its own content record. This may provide for highly fast replication of changes at the servers of the content delivery system 200. This may even lead to a scenario where the content record of one of the servers subscribed to the updated data grid memory may be updated before the content record of the originating server (initiating the change) is updated.

Employing the data grid mechanism in the content delivery system 200 may result in synchronization of all servers, in particular, the delivery servers 210, the management servers 220, the origin servers 230 and/or the shared storage servers 240 that are made aware of which server(s) is allocated for storage and/or delivery of each of the plurality of content object(s). The servers may be further exposed to characteristic(s) of each of the plurality of content object(s). Optionally, only a subset of the plurality of servers are synchronized with each other, for example, servers deployed in the same segment 202, servers of the same group, servers of the same multi-group, servers assigned to a respective content provider providing the requested content object(s) and/or the like.

In the preferred embodiment where the content delivery system 200 is divided to a plurality of segments 202, each management agent 225 communicates with the delivery agents 215 executed by the delivery servers 210 distributed in the same segment 202. For example, the management agent 225A executed by the management server 220A communicates with the delivery agents 215A and 215B executed by the delivery servers 210A and 210B respectively that are distributed in the segment 202A. in another segment, such as the segment 202B, the management agent 225B executed by the management server 220B communicates with the delivery agents 215C, 215D and 215E executed by the delivery servers 210C, 201D and 210E respectively that are distributed in the segment 202B.

The segmented architecture may allow easy scaling to add additional delivery servers 210 and/or management servers 220 in case the traffic of content delivery in a respective segment increases due to a plurality of content requests from a plurality of client devices 250. One or more additional management agents 225 may be launched to handle efficiently the increase in the content requests. The additional management agents 225 may be launched on existing management servers 220 and/or on new management servers 220 added to the content delivery system 200. In some embodiments, the management agents 225 are launched as remote services, for example, a cloud service. Similarly, in case of an overload condition in one or more segments 202, one or more additional delivery servers may be assigned to deliver the content objects to the requesting client device(s) 250. In some embodiments, the delivery servers may be launched as remote services, for example, a cloud service.

As shown at 102, the management agent 225 may monitor a plurality of delivery servers 210 by communicating with the respective delivery agents 215 in order to maintain the content record (at the management server 220) as well as the local content records (at the delivery server(s) 210) updated and synchronized with each other at all times. By maintaining the dynamically updated content record and the local content records, the management agent 225 may have accurate up-to-date knowledge of the delivery availability of each of the plurality of content objects from the plurality of delivery servers 210. Each delivery agent 215 may update its own local content record to reflect the information retrieved from other delivery server(s) 210, in particular, the delivery server(s) 210 distributed in the same segment 202. Optionally, the management agent 225 monitors only the subset delivery servers 210 and/or delivery agents 215 to maintain the updated content record. The subset may include, for example, delivery servers 210 deployed in the same segment 202, delivery servers 210 assigned to a respective content provider providing the requested content object(s) and/or the like.

The content record lists availability of the content objects from the delivery servers 210 managed by the respective management agent 225. The local content record lists availability of the content objects to which the respective delivery server 210 has access, either from the local storage and/or from the remote content sources, such as the origin servers 230 and/or the shared storage servers 240. As described before, in case of a hierarchical configuration, one or more content objects may be available to respective delivery server 210 from one or more other delivery servers 210. The content record and the local content records may be utilized as, for example, a list, a table, a database and/or the like and/or a combination thereof. The content record and the local content records have a similar structure.

For each listed content object, the content record and the local content record comprise one or more availability parameters that may be translated to, for example, retrieval latency, QoS, network resources utilization, computing resources utilization, storage resources utilization, cost and/or the like. The availability parameter(s) may be indicative of an attribute of a specific one or more content object, for example, a storage location and/or a category. However, the availability parameter(s) may be indicative of system and/or server level characteristics that may affect the availability of the respective content object(s), for example, availability of network resources, availability of computing resources, availability of storage resources, accessibility to one or more of the origin servers 230 and/or the like.

The content record and the local content records comprise several information records, for example, a list, a table, a database and/or the like and/or a combination thereof indicating the availability parameter(s) for each of the plurality of content objects. The information records may comprise one or more records, for example:

An infrastructure record
A content providers record
A content objects record
A user record
An end-user record
A secure token record The infrastructure record may comprise infrastructural, functional and/or operational characteristics of each of the servers in the content delivery system 200, for example:

A server type of the respective server indicating the type of the server, for example, a management server 220, an origin server 230, a delivery server 210 and/or a shared storage server 240. The server type supports multiple types of the servers.

A server configuration indicating, for example, available storage resources, available hardware resources, available software resources, available computing resources, available network resources, supported internal protocols, list of available services, power consumption, heat distribution and/or the like.

A delivery group configuration, for example, a group of delivery servers 210 distributed in a specific segment 202. The delivery group configuration may provide, for example, a list of the delivery server(s) 210 comprising the group used for one or more specific functionalities, relations between the group delivery servers 210, relation(s) between group(s) and geolocation for delivery and/or the like. A group definition and management may also be assigned to one or more external content delivery systems, for example, a 3rd party CDN group established under the 3rd party CDN network.

A multi-group configuration defining one or more multi-groups, for example, a hierarchical delivery group for content delivery using multiple server groups and/or the like. A group of servers may be assigned to more than a single multi-group.

Server capacity and capabilities, for example, a connectivity bandwidth, a number of maximum requests per hard drive, a maximum temperature and/or other operational parameters limitations.

The infrastructure record may further comprise networking, connection and routing information relating to the entire content delivery system 200, for example:

Connectivity among the management server(s) 220 and/or the delivery server(s) 210 themselves.

Connectivity between the management server(s) 220 and/or the delivery server(s) 210 and the origin server(s) 230, for example, the content provider servers, between the management server(s) 220 and the delivery server(s) 210.

Connectivity with the external internet world, for example, the client terminal(s) 250.

The infrastructure record may further comprise resource utilization information relating to high-level architectural entities of the network in which the content delivery system 200 is deployed. For example, in case the content delivery system 200 is deployed in the at least partially enabled MEC network, the infrastructure record may include information relating to utilization of, for example, computing resources, storage resources, networking resources and/or the like of one or more of the MEC nodes.

Each of the management agents 225 and the delivery agents 215 may be exposed to relevant information from the content delivery system infrastructure record information. For example, of other delivery servers 210 in the same segment 202, of other delivery servers 210 that together form a group, of delivery servers 210 multi-group (if relevant), of remote relevant delivery server(s) 210 and/or the like.

The information in the infrastructure record may be updated by one or more system administrators using a system admin interface through the data grid mechanism. Moreover, the information in the infrastructure record may be automatically updated by one or more of the servers in the content delivery system 200 according to infrastructural, operational and/or functional changes in the content delivery system 200.

The content providers database may provide an updated data and status of the content providers serviced by the content delivery system 200. Each content provider is assigned a copy of the content providers records that may comprise, for example:

General information, for example, a content provider name, a given unique ID and/or the like.

Account information, for example, an indication of video on demand (VOD) support, a list of live streams ID's (assigned by the authorities of the content delivery system 200), one or more technical parameters and/or limitations for the content delivery (e.g. supported bitrates, resolutions, etc.), a list of web pages and/or domains through which the content objects may be requested by the client device(s) 250, a list of the delivery protocols and/or types, a content provider activity state (e.g. active/inactive) and/or the like.

Assigned package, for example, a storage quota, a maximum number of connection and/or bandwidth per the customer and/or the content provider account and per delivery stream, a permitted delivery geographical area (by the content delivery system 200), a permitted distribution geographical area permitted by the content provider and/or the like. Optionally, the delivery and distribution geographical areas may be defined as non-delivery and non-distribution areas (blocking areas) respectively.

A list of delivery servers 210 assigned to the respective content provider. Optionally, if no delivery server 210 is listed, it indicates that all the delivery servers 210 in the content delivery system 200 are assigned to the content provider.

Global Content Usage Parameters (optional) defining content usage and restrictions for all the content objects supported by the content provider, for example, a violence level, a minimum age restriction and/or the like. These definitions may serve to prevent unqualified users 260 from consuming content object(s) that is limited according to a profile of the user(s) 260.

The content objects record may store an updated data and/or status of one or more of a plurality of content characteristics for each of the content objects available in the content delivery system 200, for example:

An IP address of the origin server 230 from which the content object is available (uploaded).

A unique ID (Identifier/Identification) of the content object.

Media information of the content object indicating the type of the content object, for example, an audio object, a video object, an image object, a data-file object, etc. The media info may also indicate combination types of one or more of the content objects, for example, a content object comprising both video and audio. The media information may further vindicate one or more characteristics of the content object, for example, an audio bitrate, a video bitrate, a playback duration, a frame resolution, a frame rate, a meta-data record inserted in the content object by the content provider and/or the like.

One or more storage locations in which the content object is available including, for example, a readiness state (e.g. uploading, not ready—preparing or syncing and waiting operation, ready, deleted, replaced), indication if the content object is stored on one or more delivery servers 210 and/or shared storage servers 240 and/or available from one or more origin servers 230 and/or the like.

A list of pre-defined shared storage servers assigned to the respective content provider.

A geographical black list (blocked) and/or white list (permitted) of IP addresses for using the content object(s), for example blocking or permitting specific one or more countries, regions, ISPs and/or any group that may be pre-defined by an IP address and/or a section of it.

Content usage parameters (optional) defining a usage and/or restriction for the respective content object. For example, the violence level, the minimum age and/or the like. These definitions may serve to prevent unqualified users 260 from consuming content object(s) that is limited according to a profile of the user(s) 260.

The user record may store records of one or more managing users authorized to manipulate, configure and/or adjust one or more elements of the content delivery system 200, for example, add/remove/modify content object(s), change operational settings of the server(s) and/or the like. The user record may detail one or more attributes for each user, for example, a responsibility, an access right, a credential and/or the like. The managing user(s) may be appointed, for example, by the content provider, by the provider of the content delivery system 200 and/or the like. The managing user may be, for example, a system administer, a content operator, a journalist and/or the like. The system administrator, for example, may change the setting for one or more live content objects. The content operator, for example, may upload content and change metadata relating to one or more of the content objects. The journalist, for example, may assign and/or tag one or more content objects (e.g. a video object) to a category. The user record may comprise, for example:

General information of the managing user, for example, a first name, a last name, a unique ID, a phone number, an email address and/or the like.

Access rights control list, for example, a role (e.g. a system admin, a content operator, a journalist, etc.), an access list of functionality, a state of use (e.g. active, inactive, black list) and/or the like.

Identification of the assigning (authorizing) content provider. Since each of the servers, for example, the management server(s) 220 and/or the delivery server(s) 210 may serve a plurality of content providers, the appropriate content provider(s) must be identified for each managing user for each of the servers and/or content objects.

The end-user record may list the (end) users 260 that are the consumers of the content object(s) delivered by the content delivery system 200. For each user 260, the end-user record may hold one or more preferences assigned to the respective user 260 by, for example, the content provider, for example, an access right and/or the like. The information in the end-user record may be updated by the managing user(s) through the system admin interface. The preference(s) may be assigned per user 260 and/or per a group of users 260 and/or for all the users 260 assigned to a respective content provider. The end-user record may also store one or more preferences provided by the user 260 himself, for example, an age, a gender, a geographical location, a field of interest and/or the like. The user 260 may use, for example, a website portal, an application and/or the like offered by the content provider and/or the provider of the content delivery system 200 for creating, modifying and/or removing a personal profile comprising the one or more preferences. The end-user record may comprise, for example:

General information of the user 260, for example, a unique ID, a first name, a last name, a phone number, an email address, an IP address and/or the like.

A profile (optional), for example, a country, a language, an age and/or the like.

User preference(s) per the user's criteria, for example, a blocking age-restricted content, one or more matching options for global content usage parameters, one or more content usage parameters and/or any other relevant parameters enabled and set by the user 260 and/or by the content provider on behalf of the user 260.

Content usage parameter(s) per content provider criteria and/or per user 260, for example, one or more matching options for the global content usage parameters, one or more content usage parameters and/or any other relevant parameters enabled and set by the user 260 and/or by the content provider on behalf of the user 260.

An identification of the content provider the end-user is assigned to.

The secure token record may store tokens that may be generated by the content delivery system 200 for each of one or more of the content providers. The tokens indicate usage (consumption) of the content objects provided by the respective content provider. Each token may refer to one or more content objects and appears on the content object(s) retrieval link. The secure token record may be maintained by the management agent(s) 225 and/or the delivery agent(s) 215 executed by servers assigned for serving the respective content provider. The secure token(s) may be used by the delivery server(s) 210 for validating an access to retrieve one or more content object(s) from the origin server(s) 230, for example, the content provider server(s). When the delivery agent 215 of the selected delivery server(s) 210 accesses the origin server(s) 230 it may use one or more of the secure tokens available from its local content record to identify itself as a legitimate delivery server 210 assigned for the content provider. This may reduce vulnerability of the origin or/and delivery server(s) 230 to malicious and/or hazardous access attempts performed by one or more potentially unauthorized servers, users, agents, processes and/or the like. Each token entry in the secure token record may comprise, for example:

An expiration time of the token validity, i.e. the last time for start retrieving the content object associated with the token.

A list of content objects associated with the token.

A token type indicating a type of the token. For example, a LIVE_STREAM type may define a token valid for live streams for a single bit rate; a LIVE_CHANNEL type may define a token valid for specific live channels and/or the like.

A number of sessions for delivering requested content object(s) associated with the token. A default value may be unlimited, for example.

A unique ID created by the respective content provider, for example, an end-user session, an IP Address, an end-user ID and/or other unique identifier for the delivery server 210.

The secure tokens may further be used by the delivery agent 215 executed by the selected delivery server(s) 210 to validate an access from the client device 250. The management agent 225 may provide the client device 250 with one or more secure tokens that may be checked at the delivery server(s) 210 when accessed by the client device 250.

The management agent 225 and the delivery agents 215 may constantly update their content record and the local content records respectively using the data grid to reflect any change in the environment of the content delivery system 200. Whenever the information in any of the information records is updated, the updated information is automatically distributed using the data grid to all relevant management servers 220 and/or delivery servers 210 and the management agents 225 and the delivery agents 215 respectively update their local content records. This allows for real-time constant synchronized replication of the changes in the representative content objects at all the relevant servers in the content delivery system 200 including, the management servers 220, the delivery servers 210, the origin servers 230 and/or the shared storage servers 240.

In case a new server (and corresponding one or more agents) is added to the content delivery system 200, the new agent(s) may subscribe to the data grid and publishes the infrastructure record information of the new server in its subscribed data grid memory. The other agents subscribed to the same data grid memory, for example, agents executed by servers distributed in the same segment 202 that monitor the data grid memory may detect the change, i.e. the added infrastructure record and may update their content records accordingly.

Similarly, in case a server becomes unavailable (removed, disconnected, crashed, etc.), an unavailability status indication may be assigned to the unavailable server in its subscribed data grid memory. The relevant agents subscribed to the same data grid memory as the unavailable server may detect the change, i.e. the unavailability indication and may update their local content records accordingly such that the unavailable server is not used by the content delivery system 200.

One or more new content objects may be uploaded by the content provider to an origin server(s) at any time. The management agent(s) 225 may apply a plurality of methods to become aware of the newly uploaded content object(s) and heir characteristics. The same procedure may be applied to content object(s) that are already available by the content delivery system 200 but are moved to a new location by, for example, the content provider.

In case the origin server(s) to which the new content object(s) is uploaded is part of the content delivery system 200, i.e. the origin server(s) 230, the management agent(s) 225 may use the data grid for monitoring changes in the availability of the content objects including addition of the newly uploaded content object(s). The management agent(s) 225 may monitor data grid memory(s) that are to which the origin server(s) 230 may be subscribed. Any change in the origin server(s) 230 content objects, including the uploading of new content object(s) may be registered in the subscribed data grid memory(s) such that the management agent(s) 225 may detect the newly uploaded content object(s) and its characteristics assigned by the content provider. In such case, where the origin server(s) 230 are not part of an inherent server system of the content provider, the content provider may the system admin interface to receive access information from the management agent(s) 225 for accessing the origin server(s) 230. The access information may include, for example, an IP address of the origin server(s) 230, credentials and/or the like.

In case the origin server(s) to which the new content object(s) is uploaded is not one of the origin servers 230, for example, is part of the inherent server system of the content provider, the management agent(s) 225 may be informed by the content provider of the newly uploaded content object(s). The content provider may use one or more predefined protocols for informing the management agent(s) 225 of the newly uploaded content object(s) including, for example, a storage location of the content object(s) and/or the like.

Optionally, the content provider may not inform the management agent(s) 225 of the newly uploaded content object(s). When receiving a content request from the client device(s) 250 for retrieving the newly uploaded content object(s), the requested content object(s) are inherently retrieved from the location of the newly uploaded content object(s) that may not be known to the management agent(s) 225. Once detecting the content request for the newly uploaded content object(s), the management agent(s) 225 may verify the information in the content request is valid since the newly uploaded content object(s) is not listed in the content record(s). The verification may include, for example, checking existence of the newly uploaded content object(s) at the location (file name and path) indicated by the content provider responding origin server(s). The management agent(s) 225 may retrieve one or more characteristics of the newly uploaded content object(s), for example, the content object type, the content provider ID, the data object(s) unique ID and/or the like from the transmissions session in which the newly uploaded content object(s) are provided to the client device(s) 250. The transmissions session may include, for example, a file Transfer Protocol (FTP), a Hypertext Transfer Protocol (HTTP), a Real-Time Messaging Protocol RTMP, a Moving Picture Experts Group Transport Stream (MPEG-TS) via User Datagram Protocol (UDP) unicast and/or multicast. Once verified, the management agent(s) 225 may update its content record(s) to include the newly uploaded content object(s). The updated information may be distributed using the data grid to other servers of the content delivery system 200.

After detecting the new content object(s), the management agent(s) 225 may allocate one or more servers, for example, delivery servers 210 and/or shared storage server(s) 240 for storing (caching) the new content object(s) in addition to their original location at the origin server(s) to which they are uploaded. The management agent(s) 225 may select the delivery servers 210 and/or the shared storage server(s) 240 for storing (caching) the new content object(s) by analyzing the local content records of the available delivery server(s) 210 and/or the shared storage servers 240 that are assigned for the content provider that uploaded the new content object(s).

The management agent(s) 225 may evaluate, for example, the infrastructure information of the delivery server(s) 210 and/or the shared storage servers 240, in particular, the storage resources, the networking resources, bandwidth and/or connectivity quality, the power consumption, the computing resources and/or the like. The management agent(s) 225 may also evaluate the location of the origin server storing the new content object(s) to select the allocated delivery server(s) 210 and/or the shared storage servers 240. For example, a specific origin server may be connected to a certain sub-cloud that may be better served by specific one or more delivery server(s) 210 and/or the shared storage servers 240. The management agent(s) 225 may evaluate the availability of pre-defined servers, groups or multi-groups assigned for the content provider that is providing the new content object(s). For example, by default, the management agent(s) 225 may allocate all the delivery servers 210 and/or the shared storage servers 240 assigned for the respective content provider. The management agent(s) 225 may evaluate costs involved in storing and delivering the new content object(s) from each of the delivery servers 210 and/or the shared storage servers 240. For example, a bandwidth assignment and delivery cost, a cost of a service when using delivery servers 210 and/or the shared storage servers 240 provided by a cloud service, for example, Amazon™ cloud and/or the like.

The management agent(s) 225 may further evaluate the QoS of the network on the path between the delivery server(s) 210 and/or the shared storage server(s) 240 to requesting client device(s) 250. For example, different client devices 250 may be connected to the content delivery system 200 through different ISPs, therefore the management agent(s) 225 may allocate delivery server(s) 210 and/or shared storage server(s) 240 that are currently supported well by the ISP. In addition, the management agent(s) 225 may evaluate the ISP and/or a mobile service operator, the geographical location of the requesting terminal and/or the like.

In addition, the management agent(s) 225 may select the allocated servers according to the characteristics of the content object(s), for example, the type, the usage and/or the like. For example, the management agent(s) 225 may select a delivery server 210 that is close to the requesting client device 250 for storing (caching) packets of live streaming content object(s) (in addition to storing them at the originating origin server(s) 230) in order to ensure a smooth delivery of the streamed content object(s) to the client device 250. On the other hand, the management agent(s) 225 may select a shared storage server 240 that is may entail low storage costs for storing (caching) downloadable content object(s) and/or downloadable stream data object(s), for example, a VOD object, a data file and/or the like.

The management agent(s) 225 may inform the allocated servers of the new content object(s) using the data grid mechanism. Additionally and/or alternatively, the management agent(s) 225 may inform the allocated servers of the new content object(s) by directly communicating with the delivery agents of the allocated servers and/or by exposing some or all of the content record(s) to the allocated servers.

As shown at 104, the management agent 225 may receive from the client device 250 a content request for retrieving one or more content object(s). The content request may be directed from the client device to the management server 220 through a DNS service. The content consumption agent 255 executed on the client device 250 issues modified URL directing to the DNS servers of the content delivery system 200.

The URL may provide, for example:

A domain for the DNS server of the content delivery system 200.

A unique ID representing the requested content object(s). The unique ID may also identify the content provider.

An identification of the type of the requested content object(s), for example, a sound clip, a streaming video and/or the like.

The user device 250 may communicate with the DNS server(s) of the content delivery system 200. The DNS server(s) may use domain(s) and IP address(es) relation table to re-direct the content request to the management agent(s) 225. The management agent 225 may manipulate the routing map(s) and/or table(s) at the DNS servers to direct the user device 250 to access the management server 220. This may serve to reduce access time and/or response time for the interaction of the client device 250 with the management agent 225.

Optionally, the management agent 225 provides at least some DNS functionality i.e., one or more services of the DNS server(s) for processing the address translation, in order to reduce and/or avoid the need for the DNS server thus reducing latency for resolving network addresses. For example, in a private network where the domain names and/or the IP address(es) are known, the management agent(s) 225 may direct the content request itself with no intervention of the DNS server(s). In complex networks, where the DNS server(s) may be essential, the management agent(s) 225 may manipulate the DNS routing maps and/or tables of the DNS server(s) in order to direct the content request(s) to appropriate one or more of the management agents 225.

Optionally, in case the management agent 225 is overloaded with one or more previous content requests, the management agent 225 may initiate a launch of one or more additional management agents 225. The additional management agent(s) 225 may be launched on the same management server 220, on a different management server 220 and/or a combination thereof. Moreover, the additional management agent(s) 225 may be executed as services provided by one or more of the cloud services. Adapting the number and/or the scope of the management agents 225 according to the load of content requests may allow for easy scaling and possibly cost reduction as redundant management agent(s) 225 and/or management server(s) 220 may be removed in case of low content request load.

Optionally, the content request received from the client device 250 includes one or more user characteristics of the associated user 260. The user characteristics may be available from, for example, a profile created by the user 260 using the client device 250. The content consumption agent 255 may have access to the user characteristic(s) and may therefore include them in the content request.

Optionally, the management agent 225 is capable to receive the content request from one or more other CDNs, for example, a $3^{rd}$ party CDN. The other CDN(s) may issue the content request for the requested content object(s) in order to deliver them to one or more users subscribed to the $3^{rd}$ party CDN. Such a scenario may take place in case, for example, the requested content object(s) being exclusively available from the content delivery system 200. Another scenario may be occur in case the other CDN(s) is currently overloaded with servicing in progress content requests such that the other CDN(s) redirects some of the content requests to the content delivery system 200 in order to maintain serviceability for its subscribers during the overload period.

As shown at 106, the management agent 225 that received the content request may evaluate availability of the requested content object(s) from the delivery servers 210. The management agent 225 may analyze the requested content object(s) according to its content record that lists availability of the plurality of content object(s) available by the content delivery system 200. The management agent 225 may first verify that the requested content object(s) is available (listed) in the content record database and the content provider ID is available (listed) in the content providers record. The management agent 225 may further check, for example, that the delivery geographical location of the client device 250 is defined at the content providers record. The management agent 225 may also verify the user 260 is allowed to consume the requested content object(s) according to information available from the end-user record in case the user is a registered user. Based on the verification, the management agent 225 may reject the content request from the client device 250. If the content request is verified to comply with the restriction(s) listed in the content record, the management agent 225 may proceed to analyzing the content record in order to locate the requested content object(s).

The management agent 225 may check which delivery servers 210, groups and/or multi-groups are assigned for the content provider that provides the requested content object(s). The management agent 225 may evaluate, for example, the infrastructure information of the delivery server(s) 210, for example, the storage resources, the networking resources, bandwidth and/or connectivity quality, the power consumption, the computing resources and/or the like. The management agent 225 may evaluate costs involved in delivering the requested content object(s) from each of the delivery servers 210. The cost evaluation may consider, for example, a bandwidth delivery cost, a bit rate cost, a cost of a service when using delivery servers 210 provided by a cloud service and/or the like. The management agent 225 may further evaluate the QoS of the network on the path between the delivery server(s) 210 to the client device 250. In addition, the management agent 225 may evaluate the ISP and/or a mobile service operator, the geographical location of the client device 250 and/or the like. Moreover, in case the requested content object(s) are not available locally at any of the delivery server(s) 210 and need to be retrieved from a source server, i.e. the origin server(s) 230 and/or the share storage server(s) 240, the management agent 225 may evaluate the QoS of the network on the path between the delivery server(s) 210 and the source server.

Optionally, the management agent 225 evaluates the availability of the requested content object(s) according to one or more future availability parameters with respect to one or more future events, for example, future network traffic in the content delivery system 200, future computing load at one or more delivery servers 210 and/or the like. The future event may be a planned event, for example, a live streaming of a football match that may be requested by a plurality of client devices 250. The management agent 225 may identify the future event(s) from one or more logs, for example, a calendar, a broadcasting plan and/or the like. The planned event(s) may also be provided by the managing user(s) using the system admin interface. The planned event may also be, for example, a holiday during which a plurality of client devices 250 are not used in one or more geographical locations, for example, a country, a region and/or the like Optionally, the management agent(s) 225 employ one or more learning mechanism to identify one or more content consumption pattern in the content delivery system 200. The content consumption pattern(s) may indicate a consumption pattern, for example, type of content object(s) consumed per a time of day, type of content object(s) per a geographical location and/or the like. The content consumption pattern(s) may further indicate operational patterns of the server(S) in the content delivery system 200, for example, which delivery server(s) 210 provide best QoS for specific content objects per time of day, which delivery server(s) 210 provide best QoS for specific content objects per geographical location and or the like. The management agent(s) 225 may analyze the detected content consumption pattern(s) to estimate one or more future availability parameter(s) for the delivery server(s) 210 with respect to the requested content object(s). For example, the management agent 225 may identify that specific delivery server(s) 210 are loaded during certain times, for example, at night, during weekend and/or the like. The management agent 225 may then define the identified load period(s) as one of the content consumption patterns. As another example, the management agent 225 may identify that on a plurality of occasions immediately following a publication of content object(s) by a certain content provider, for example, a newsbreak on CNN, an extremely high number of content requests is received at the content delivery system 200 for retrieving the published content object(s). The management agent 225 may mark such a trend as one or more of the content consumption patterns. Based on the learned future availability parameter(s), the management agent 225 may evaluate the certain delivery server(s) 210 are expected to be less loaded for delivering the requested content object(s) to the client device 250.

Optionally, in case the delivery server(s) 210 is overloaded with delivery of content object(s) to the client device(s) 250, the management agent 225 may initiate a launch of one or more additional delivery servers 210 and/or delivery agents 215 and/or a combination thereof. The additional delivery agent(s) 215 may be launched on the delivery servers 210 existing in the content delivery system 200, on new servers added to the content delivery system 200 different management server 220 and/or a combination thereof. Moreover, the additional delivery agent(s) 215 may be executed as services provided by one or more of the cloud services. Adapting the number and/or the scope of the delivery agents 215 and/or the delivery servers 210 according to the load of delivery of the content object(s) may allow for easy scaling and possibly cost reduction due to avoiding loading the use of excessive delivery agent(s) 215 and/or delivery servers 210 in case of low delivery load.

As shown at 108, based on the analysis, the management agent 225 may select one or more preferred delivery server 210 evaluated to provide best performance among the plurality of delivery servers 210 for providing the requested content object(s) to the client device 250. The management agent 225 may evaluate the expected performance according to one or more performance criteria, for example, latency, throughput, size of the LAG, quality of service (QoS), network utilization, storage utilization, cost and/or the like. The size of the LAG may indicate the number of network links and/or ports allocated for retrieving (from the origin server(s) 230 and/or the shared storage server(s) 240) and/or providing (to the client device 250) the requested content object(s). For example, the management agent 225 may estimate that a specific delivery server 210 has may present best QoS and/or lowest latency for the delivering the requested content object(s) to the client device 250 because the network path between the specific delivery server 210 and the client device 250 presents the best QoS and/or the lowest latency. The best QoS and/or the lowest latency may result, for example, from the fact that the network path is short and/or the network path provides a high bandwidth. In another example, the management agent 225 may identify that the requested content object(s) are not locally available in any of the delivery servers 210 and the storage resources of a specific delivery server 210 are sufficient and/or are less utilized compared to the other delivery servers 210. The management agent 225 may therefore select the specific delivery server 210 that is suitable for storing and delivering the requested content object(s) to the client device 250.

The management agent 225 may select the delivery server(s) according to one or more characteristics of the user 260, for example, a user profile, credentials, an age restriction, a geographical area restriction and/or the like as they are available from the in the end-user record in case the user 260 is a registered user. Optionally, the management agent 225 may retrieve the characteristics of the user 260 from the content request in case such characteristics are included in the content request.

Based on the evaluation, different delivery servers 210 may be selected to deliver the requested content object(s) under different conditions and/or scenarios. For example, as shown in FIG. 2, two client devices 250A and 250B executing a content consumption agent 255A and 255B respectively may issue an content requests for retrieving content object(s). However, the two client devices 250A and 250B may be located at two different geographical locations. Specifically, according to the preferred distributed system embodiment, each of the client devices 250A and 250B may access different segments of the content delivery system 200. To further illustrate the evaluation based selection of the preferred delivery server(s) 210, it is assumed that both the client devices 250A and 250B issue a similar content request for retrieving the same content object(s). Based on the evaluation, the management agent 225A executed by the server 220A accessed by the client device 250A may select the delivery server 210B to provide the requested content object(s) to the client device 250A. However, the management agent 225B executed by the server 220B accessed by the client device 250B may select a different delivery server 210—the delivery server 210B to provide the requested content object(s) to the client device 250B. The different selection may result from one or more availability parameters that may be different for the two client devices 250A and 250B.

As another example, in case the client device 250B issues a content request for a live streaming feed from the camera 260, the management agent 225B may select the delivery server 210E as the preferred deliver server. The management agent 225B may select the delivery server 210E since the delivery server 210E may have, for example, better QoS communicating with the origin server 230B from which the live streaming feed from the camera 260 originates. On the other hand, when the management agent 225B receives a different content request from the client device 250, for example, for stored content object(s), for example, a VOD content object, the management agent 225B may select the delivery server 210C as the preferred deliver server. The management agent 225B may select the delivery server 210C since the delivery server 210C may present, for example, a lowest latency for delivering the VOD content object to the client device 250.

Optionally, the management agent 225 selects the preferred delivery server(s) 210 according to the one or more future availability parameters. For example, assuming a live streaming object of a live event is expected to start, the management agent 225 may estimate that one or more delivery servers 210 may be loaded with delivery of the live streaming object. The management agent 225 may therefore direct the client device 250 to one or more other delivery servers 210 that are not involved and/or less occupied with delivery of the live streaming object.

Optionally, the preferred delivery server(s) selected by the management agent 225 is part of another CDN, for example, a $3^{rd}$ party CDN, for example, Celcom, Akamai and/or the like. The management agent 225 may select the $3^{rd}$ party delivery server(s) in case the requested content object(s) is not available from the origin servers 230, for example, the requested content object(s) is exclusively available from the $3^{rd}$ party CDN. As another example, the management agent 225 may select the $3^{rd}$ party delivery server(s) in case the delivery server(s) 210 are overloaded and may not be available to provide the content object(s) according to the content request.

Optionally, the management agent 225 selects the delivery server(s) 210 according to one or more operational characteristics of the client device 250, for example, a display resolution, a computation resource, a storage capacity and/or the like. For example, the content request from the client device 250 is for retrieving a video content object. The same video content object may be available in the content delivery system 200 in 3 compression formats, for example, AVI, MPEG-2 and H-264. The management agent 225 may select the delivery server(s) 210 to provide the video content object in a format that fits the computation resources of the client device 250, for example, H-264 providing best quality and may yet be processed by the client deice 250. Additionally and/or alternatively, the management agent 225 may select a plurality of alternatives for the requested content object(s) to allow the client device 250 and/or the user 260 to select the desired alternative. For example, the same video content object may be available with subtitles for a plurality of languages. The management agent 225 may select the delivery server(s) 210 to provide the video content object with a plurality of languages to allow the user 260 to select the desired language.

Optionally, the management agent 225 selects the delivery server(s) 210 to provide the requested content object(s) in an adjusted format to adapt to one or more constraints of the content delivery system 200, for example, the network resources, the computing resources, the storage resources and/or the like. The adjusted content object(s) may be adjusted, for example, to reduce bit rate, to increase compression level, to reduce image quality, to reduce image resolution and/or the like in order to reduce consumed bandwidth, consumed computing power, storage capacity and/or the like. The For example, the requested content object(s) may be available in three compression levels, low compression (high quality), standard compression (medium quality) and high compression (low quality). Assuming the content request is directed to retrieve the requested content object(s) in low compression level. Based on the evaluation of the content delivery system 200 infrastructure indicating, for example, the network resources are insufficient to provide the low compression requested content object(s), the management agent 225 may decide to select the delivery server(s) 210 to provide the client device 250 with the standard or high compression rate requested content object(s). The adjusted content object(s) may also be adjusted according to one or more characteristics of the requested content object(s), for example, an image quality, a video quality and/or the like. For example, in case the requested content object is a dynamic high motion video object and/or live stream object, the management agent 225 may decide to select the delivery server(s) 210 to provide the requested content object(s) to the client device 250 with a higher bit rate to maintain the quality of the video/live stream object.

Optionally, the management agent 225 selects the delivery server(s) 210 to provide one or more represented content object(s) in response to the content request for the requested content object(s), for example, a manipulated content object(s), an overlaid content object(s), a replacement content object(s) and/or the like. For example, in case the management agent 225 identifies the requested content object(s) is inappropriate for delivery to the user 260 based on the analysis of the user 260 characteristic(s), the management agent 225 may select the delivery server(s) 210 to provide the represented content object(s). The user 260 characteristic(s), for example, the age, the geographical location, the access permission dictated by the content provider and/or the like may be available from the end-user record in case the user 260 is a registered user. The represented content object(s) may include, for example, an overlaid text stating the content is not available for the user 260, an overlaid link to a site of the content provider presenting the content agreement and/or the like. Additionally and/or alternatively, the represented content object(s) may be manipulated to include one or more additional content objects coupled with the requested content object(s). For example, in case the management agent 225 identifies the requested content object(s) is inappropriate for delivery to the user 260, the management agent 225 may select the delivery server(s) 210 to provide the requested content object(s) with an added playback expressing a statement of the inappropriate use. The represented content object(s) may further be a replacement content object(s), for example, in case the requested content object(s) is a drama series episode VOD object which is only available for premium users 260 subscribed to the content provider, the represented content object(s) may be VOD object of the same series of a previous season and/or the like.

As shown at 110, the management agent 225 may reply to the client device 250 to provide the client device 250 with a reply indicating the selected delivery server(s) 210. The reply may include an address of the selected delivery server(s) 210, for example, the IP address of the selected delivery server(s) 210, the URL of the selected delivery server(s) 210, a link to the selected delivery server(s) 210 and/or the like. The address may then be used by the content consumption agent 255 executed by the client device 250 to initiate a transmission session with the delivery agent 215 executed by the selected delivery server(s) 210 to access, retrieve, process, play, manipulate and/or modify the requested content object(s). The reply the management agent 225 provides to the client device 250 may further include a Media ID, an alternative IP address, URL and/or link of an alternative delivery server(s) 210. Optionally, the management agent 225 manipulates the routing table of the DNS service and/or server(s) to direct the client device 250 to the selected delivery server(s) 210.

The reply from the management agent 225 may further include a metadata record comprising, for example, metadata information, a script and/or the like that may be used by the content consumption agent 255 to retrieve the requested content object(s). For example, the metadata record may indicate one or more characteristics of the selected delivery server(s) 210 and/or the respective delivery agent(s) 215 executed by the selected delivery server(s) 210. For example, type of session protocols supported by the respective delivery agent(s) 215, for example, HTTP Dynamic Streaming (HDS), Smooth, HTTP Live Streaming (HLS), RTMP, Real Time Streaming Protocol (RTSP) and/or the like. The metadata record may further include one or more directives relating to the provided content object(s), for example, in case the management agent 225 selects the selected delivery server(s) 210 to provide a plurality of alternative content object(s), the metadata information may indicate the alternatives and one or more attributes of the alternative content object(s). The attributes of the alternative content object(s) may include, for example, a bit rate, a bandwidth, a language sound track, translation subtitles and/or the like. The metadata record may also include one or more of the secure tokens to be used by the selected delivery server(s) to retrieve the requested content object(s) from the origin server(s) 230, for example, the content provider's servers. The secure token(s) may also be used by the delivery agent(s) 215 executed by the selected delivery server(s) 210 to validate the access from the client device 250.

The content consumption agent 255 executed by the client device 250 may use the metadata information to establish the transmission session with delivery agent(s) 215 in order to access, retrieve, process, play, manipulate and/or modify the requested content object(s).

Optionally, the metadata record is adjusted by the respective delivery agent(s) 215 executed by the selected delivery server(s) 210. The delivery agent(s) 215 may adjust the metadata record in adapt the transmission session with the client device 250 according to one or more availability parameters that may have changed during the time since the client device 250 was directed by the management agent 225 to the selected delivery server(s) 210. For example, the network resources of a respective selected delivery server 210 may be reduced due to an event that took place after the client device 250 was directed to the respective delivery server 210. In such case, the delivery agent(s) 215 executed by the respective delivery server 210 may adjust the metadata record, for example, to indicate to the client device 250 that the requested content object(s) are provided in a lower bit rate than initially indicated by the management agent 225. This is because while the network resources identified initially by the management agent 225 may support the (higher) bit rate as indicated by the management agent 225, the reduced network resources are incapable for supporting the initially indicated bit rate for the requested content object(s). The content consumption agent 255 at the client device 250 may then use the adjusted metadata record to establish the transmission session with delivery agent(s) 215 in order to access, retrieve, process, play, manipulate and/or modify the requested content object(s).

In case the requested content object(s) is not available locally to the selected delivery server(s) 210, the selected delivery server(s) 210 may access one or more other servers, for example, the origin server 230 and/or the shared storage server 240 to retrieve the requested content object(s). The selected delivery server(s) 210 may be familiar (aware) of the location of the requested content object(s) by analyzing its local content record that is maintained updated with all content object(s) available by the content delivery system 200. The fetching operation of the selected delivery server(s) 210 is seamless to the content consumption agent 255 at the client device 250. This may be demonstrate in FIG. 2 where the content consumption agent 255A executed by the client device 250A request for content object(s) that may not be available locally to the selected delivery server 210B from the local storage 245. In such case, the delivery server 210B may access one or more other servers, for example, the origin server 230A and/or the shared storage server 240. The fact that the requested content object(s) is not available locally to the selected delivery server(s) 210 is known to the management agent 225 when selecting the preferred delivery server(s) 210. However, based on the analysis the management agent 225 performed at step 106, the management agent 225 may select the selected the delivery server(s) 210 even though the requested content object(s) are not locally available to it. The management agent 225 may take such a decision in case, for example, none of the delivery servers 210 has the requested content object(s) stored locally (cached). The management agent 225 may evaluate that the selected delivery server(s) 210 presents the best availability parameters for retrieving the requested content object(s) from the origin server(s) 230 and/or the shared storage server(s) 240.

Optionally, the management agent 225 monitors the transmission session between the client device 250 and the selected delivery server 210 and directs the content consumption agent 255 at the client device 250 to re-issue the content request while the content consumption agent 255 retrieves the requested content object(s). After re-issuing the content request, the content delivery process 100 may be repeated from step 104 (step 102 is executed constantly with no dependence on any content request) such that the management agent 225 may select updated selected delivery server(s) 210 to provide the requested content object(s) to the client device 250. The management agent 225 may direct the direct content consumption agent 255 at the client device 250 to re-issue the content request in case one or more other delivery servers 210 are estimated to provide better performance for delivering the requested content object(s) to the client device 250. By re-issuing the content request, the management agent 225 may direct the content consumption agent 255 to initiate the transmission session with the better performing delivery server(s) 210.

Directing the content consumption agent 255 to re-issue the content request may typically occur during long retrieval times, for example, consuming a VOD object, consuming a live feed object of a prolonged event, and/or the like. In order to assure high service quality during a plurality of events that may take place during the entire retrieval time, updated delivery server(s) 210 that may provide a better delivery service may be offered to the client device 250.

This may result from one or more of a plurality of reasons, for example, a fluctuation in the network used by the selected delivery server(s) 210, transition of the client device 250 to a new geographical location, a resources impact due an expected future event, a resource impact expected based on the content consumption pattern(s) and/or the like. After the client device 250 re-issues For example, the selected delivery servers 210 may experience degradation in one or more of its resources, for example, the network connectivity. The degraded network connectivity may refer to the connection with the client terminal 250 and/or with one or more servers, for example the origin server 230 and/or the shared storage server 240 from which the selected delivery server 210 retrieves the requested content object(s). In such an event, the management agent 225 may decide to direct the client device 250 to connect to another content delivery server(s) 210 that is not suffering the network connectivity degradation. As another example, the client device 250 is changing its geographical location, for example, travelling, and the client device 250 is handed over by the cellular service system from one base station to another. In such case, the management agent 225 may determine that the new base station may be better served from a different delivery server(s) 210 than the one the previous base station was retrieving the requested content object(s). In another scenario, a future event, for example, a live music concert broadcast is expected to start and degrade one or more of the availability parameters of the currently selected delivery server(s) 210. The management agent 225 may determine that another delivery server(s) 210 may present better availability while the future event is in progress. The management agent 225 may also decide to update the delivery server(s) 210 for delivering the requested content object(S) to the client device based on one or more of the content consumption patterns. For example, one of the content consumption patterns may indicate a reduced traffic over some network segment during a certain period of time, for example, 2:00 AM through 6:00 AM. In case the current time is within the time interval indicated by the content consumption pattern, the management agent may decide to direct the client device 250 to connect to the updated selected delivery server(s) 210 that may reside on the low traffic network segment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant content objects will be developed and the scope of the term content objects is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of managing content delivery, comprising: executing a management agent on a processor of a server for:
receiving over a distributed content delivery network (CDN) a content request for retrieving at least one content object, the content request is received from a content consumption agent executed on a client device;
instructing a delivery server to establish a data transmission session with the content consumption agent via the CDN, wherein the delivery server transmits a portion of the at least one content object to the content consumption agent;
monitoring a plurality of delivery servers and estimating accordingly when at least one another delivery server can provide better performance for delivering the at least one content object to the client device;
sending the content consumption agent instructions to re-issue another content request while the content consumption agent retrieves the at least one content object;
in response to a reception of the another content request, instructing an establishment of a new data transmission session between the content consumption agent and the at least one another delivery server for allowing the content consumption agent to retrieve another portion of the at least one content object using the new data transmission session.

2. The method of claim 1, wherein the portion of at least one content object comprises packets of live streaming content object.

3. The method of claim 1, the content consumption agent retrieves the at least one content object for displaying a live video stream using the client device.

4. The method of claim 1, wherein the at least one content object is selected from a group consisting of: a VOD object, a live feed object, and a video stream object.

5. The method of claim 1, wherein the delivery server is selected according to at least one availability parameter that indicates an availability of the at least one content object from the delivery server.

6. The method of claim 1, wherein the delivery server and the at least one another delivery server are deployed in different segments.

7. The method of claim 1, further comprising identifying the at least one content object according to a member of a group consisting of a content type, a content object identification record and at least one content characteristic.

8. The method of claim 1, wherein the at least one another delivery server is selected according to at least one availability parameter that indicates at least one of: a latency for retrieving said at least one content object, an availability of network resources, an availability of storage resources, an availability of computing resources and a workload level.

9. The method of claim 1, wherein said at least one content object is routed using a routing map of a Domain Naming system (DNS) server serving said CDN in order to direct said at least one content object via at least one edge server.

10. The method of claim 1, wherein said at least one another delivery server is estimated to present a best performance among a plurality of delivery servers for providing the at least one content object;
wherein said best performance is evaluated based on at least one performance criterion selected from a group consisting of: latency, a size of a Link Aggregation Group (LAG), throughput, quality of service (QoS), network utilization, storage utilization and cost.

11. The method of claim 1, wherein said management agent is informed of at least one new content object by dynamically monitoring in real time at least one origin server providing said at least one new content object.

12. The method of claim 1, wherein said delivery server performs as an edge server executing said management agent.

13. The method of claim 1, wherein said at least one another delivery server is selected according to at least one of a group consisting of: at least one future availability parameter of each of a plurality of delivery servers based on an analysis of a content consumption pattern, at least one characteristic of a user using said client device, and at least one operational characteristic of said client device.

14. The method of claim 1, wherein said delivery server is capable of providing a plurality of alternative content objects to said content object to allow said client device to select a desired alternative from said plurality of alternative content objects according to at least one operational characteristic of said client device.

15. The method of claim 1, wherein said estimating comprises estimating a degradation in a performance of said delivery server from a change in a geographical location of said client device.

16. The method of claim 1, wherein said estimating comprises employing at least one learning mechanism to identify at least one content consumption pattern of at least one of the content object and the client device.

17. A server managing content delivery, comprising:
a memory hosting a management agent;
a processor executing the management agent for:
receiving over a distributed content delivery network (CDN) a content request for retrieving at least one content object, the content request is received from a content consumption agent executed on a client device;
instructing a delivery server to establish a data transmission session with the content consumption agent via the CDN, wherein the delivery server transmits a portion of the at least one content object to the content consumption agent;
monitoring a plurality of delivery servers and estimating accordingly when at least one another delivery server can provide better performance for delivering the at least one content object to the client device;
sending the content consumption agent instructions to re-issue another content request while the content consumption agent retrieves the at least one content object;
in response to a reception of the another content request, instructing an establishment of a new data transmission session between the content consumption agent and the at least one another delivery server for allowing the content consumption agent to retrieve another portion of the at least one content object using the new data transmission session.

* * * * *